(12) United States Patent
Lee et al.

(10) Patent No.: US 11,036,998 B2
(45) Date of Patent: Jun. 15, 2021

(54) CCTV VIDEO SMART SURVEILLANCE SYSTEM AND METHOD THEREOF

(71) Applicant: Jeju National University Industry-Academic Cooperation Foundation, Jeju-si (KR)

(72) Inventors: Donghyeok Lee, Jeju-si (KR); Namje Park, Jeju-si (KR)

(73) Assignee: JEJU NATIONAL UNIVERSITY—ACADEMIC COOPERATION FOUNDATION, Jeju-si (KR)

( * ) Notice: Subject to any disclaimer, the term of this patent is extended or adjusted under 35 U.S.C. 154(b) by 0 days.

(21) Appl. No.: 16/690,233

(22) Filed: Nov. 21, 2019

(65) Prior Publication Data

US 2020/0218903 A1  Jul. 9, 2020

(30) Foreign Application Priority Data

Nov. 21, 2018  (KR) .......................... 10-2018-0144548

(51) Int. Cl.
*G06T 7/194* (2017.01)
*G06K 9/00* (2006.01)
*G06K 9/32* (2006.01)
*G08B 13/196* (2006.01)
*H04N 5/232* (2006.01)

(52) U.S. Cl.
CPC ..... *G06K 9/00771* (2013.01); *G06K 9/00288* (2013.01); *G06K 9/3233* (2013.01); *G06T 7/194* (2017.01); *G08B 13/19686* (2013.01); *H04N 5/23206* (2013.01); *G06K 2209/15* (2013.01)

(58) Field of Classification Search
None
See application file for complete search history.

(56) References Cited

U.S. PATENT DOCUMENTS

| | | | |
|---|---|---|---|
| 6,829,356 B1* | 12/2004 | Ford | H04L 9/0894 380/277 |
| 7,623,675 B2* | 11/2009 | Ayachitula | G06F 16/78 382/103 |
| 9,786,075 B2* | 10/2017 | Aguera-Arcas | G06T 15/205 |
| 10,445,885 B1* | 10/2019 | Nathan | G06K 9/4642 |

OTHER PUBLICATIONS

Shankar (NPL: "A New k out of n Secret Image Sharing Scheme in Visual Cryptography," IEEE 2016).*

\* cited by examiner

*Primary Examiner* — Shadan E Haghani
(74) *Attorney, Agent, or Firm* — Lex IP Meister, PLLC

(57) ABSTRACT

A smart surveillance system includes a communicator configured to communicate with a closed circuit television (CCTV) camera and a cloud server, a background image extractor configured to analyze CCTV image data received from the CCTV camera and to extract a background image, an object image analyzer configured to distinguish an object image from the background image through big data analysis of a CCTV image, a region of interest (ROI) extractor configured to extract an ROI corresponding to the object image, and a controller configured to provide the background image and the ROI to the cloud server, to receive the background image and the ROI from the cloud server, to combine the background image and the ROI, and to generate a complete CCTV image, if necessary.

6 Claims, 4 Drawing Sheets

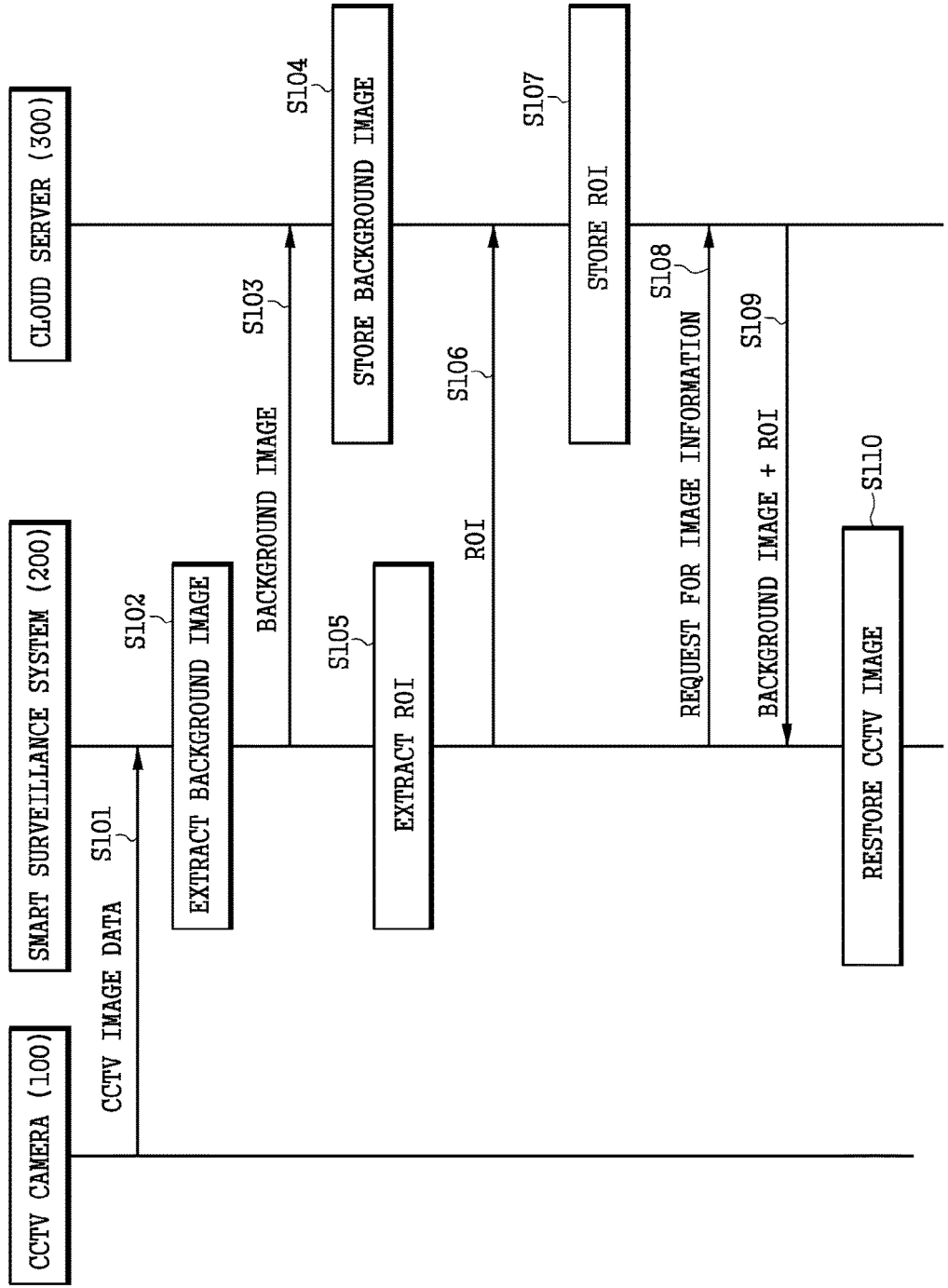

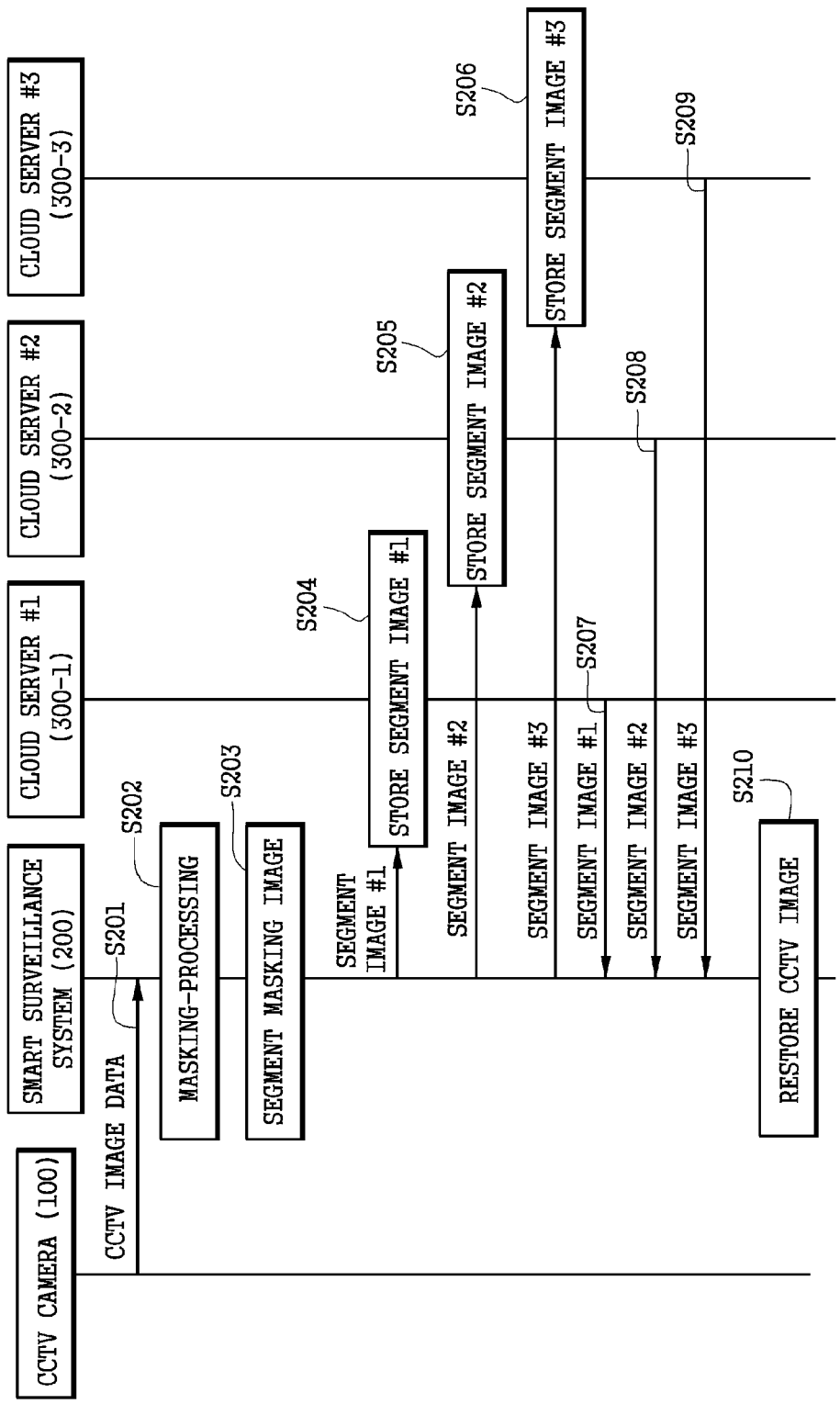

CCTV VIDEO SMART SURVEILLANCE SYSTEM AND METHOD THEREOF

CROSS-REFERENCE TO THE RELATED APPLICATION

This application claims priority from Korean Patent Application No. 10-2018-0144548, filed on Nov. 21, 2018, in the Korean Intellectual Property Office, the disclosure of which is incorporated herein by reference in its entirety.

BACKGROUND OF THE INVENTION

Field of the Invention

The present disclosure relates to a closed circuit television (CCTV) image smart surveillance system and a method thereof.

Description of the Related Art

Closed circuit television (CCTV) image data has characteristics of high volume data, which has a limit in terms of data retention (data storage). In the future, the volume of image data seems to be further increased. Cue to enhancement in CCTV image quality, which requires nigh-capacity storage and is directly associated with an issue cost in image data processing. Thus, currently, an image captured by a CCTV is processed using a method of removing partial image for predetermined time. Needless to say, is ideal to remove an image that already used to achieve a kind of surveillance purpose (e.g. public safety) from a storage, but an image to be necessarily retained for a specific purpose needs to be retained for a long time, and thus, there is a need for a separate measure for processing a high volume image.

CITED REFERENCE

Patent Document (Patent Document 0001) Korean Patent No. 10-1422759 (Method for storing and sharing data without collusion in data outsourcing environment)

SUMMARY OF THE INVENTION

Therefore, the present disclosure has been made in view of the above problems, and it is an object of the present disclosure to provide a smart surveillance system and a method thereof for analyzing an entire image captured by a closed circuit television (CCTV) camera, storing a stationary background image (e.g. static image) in the form of an image having a small volume, and storing a video image with respect to only a partial image corresponding to a meaningful shape or a moving object based on object recognition via big data analysis.

Another object of the present disclosure provides a smart surveillance system and a method thereof for restoring a complete image using the remaining segmented images, and thus even if one segment image of the N segmented segment images is lost or is exposed due to hacking or the like, a complete image may be restored.

In accordance with an aspect of the present disclosure, the above and other objects can be accomplished by the provision of a smart surveillance system including a communicator configured to communicate with a closed circuit television (CCTV) camera and a cloud server, a background image extractor configured to analyze CCTV image data received from the CCTV camera and to extract a background image, an object image analyzer configured to distinguish an object image from the background image through big data analysis of the CCTV image data, a region of interest (ROI) extractor configured to extract an ROI corresponding to the object image, and a controller configured to provide the background image and the ROI to the cloud server, to receive the background image and the ROI from the cloud server, to combine the background image and the ROI, and to generate a complete CCTV image, if necessary.

The smart surveillance system may further include a masking processor configured to analyze the ROI and to perform masking-processing on a specific portion, and a masking ROI divider configured to divide a masking ROI including the masking-processed portion into a plurality of pieces via encryption processing, wherein the controller provides the plurality of masking ROIs to a plurality of cloud server, and receives the masking ROIs from the plurality of cloud servers, respectively, and restore an ROI prior to the masking-processing if necessary.

The encryption processing may be capable of restoring a masking ROI prior to segment using only remaining (N−1) masking ROIs even if one divided masking ROI is lost when the masking ROI is divided into N masking ROIs using a visual cryptography of a secret sharing method.

The masking processor may perform masking-processing on a portion for identifying personal information.

The portion for identifying the personal information may include one or more of a face or a number plate of an automobile.

In accordance with an aspect of the present disclosure, the above and other objects can be accomplished by the provision of a method of a smart surveillance system, the method including receiving closed circuit television (CCTV) image data from a CCTV camera, analyzing the CCTV image data and extracting a background image, storing the background image in a cloud server, analyzing big data of the CCTV image data and distinguishing an object image from the background image, extracting a region of interest (ROI) corresponding to the object image, providing the ROI to the cloud server, receiving the background image and the ROI from the cloud server, combining the background image and the ROI, and generating a complete CCTV image, if necessary.

The method may further include analyzing the ROI and performing masking-processing on a specific portion, dividing a masking ROI including the masking-processed portion into a plurality of pieces via encryption processing, providing the plurality of divided masking ROIs to a plurality of cloud server, and making a request to the plurality of cloud servers for the divided masking ROI, receiving each divided masking ROI, and restoring a masking ROI image prior to segment.

The encryption processing may be capable of restoring a masking ROI prior to segment using only remaining (N−1) masking ROIs even if one divided masking ROI is lost when the masking ROI is divided into N masking ROIs using a visual cryptography of a secret sharing method.

The specific portion may be a portion for identifying personal information.

The portion for identifying the personal information may include one or more of a face or a number plate of an automobile.

BRIEF DESCRIPTION OF THE DRAWINGS

The above and other objects, features and other advantages of the present disclosure will be more clearly understood from the following detailed description taken in conjunction with the accompanying drawings, in which:

FIG. 4 is a diagram showing a method of segmenting a background image and an ROI from CCTV image data and providing the segmented image to a cloud server according to an embodiment of the present disclosure; and FIG. 5 is a diagram showing a method of masking-processing CCTV image data, segmenting the CCTV image data into a plurality of pieces, and storing the segmented images in a plurality of cloud servers according to an embodiment of the present disclosure.

DETAILED DESCRIPTION OF THE INVENTION

The attached drawings for illustrating exemplary embodiments of the present disclosure are referred to in order to gain a sufficient understanding of the present disclosure, the merits thereof, and the objectives accomplished by the implementation of the present disclosure.

However, the present disclosure may be embodied in many different forms and should not be construed as being limited to the embodiments set forth herein These embodiments are provided so that this disclosure will be thorough and complete, and will fully convey the concept of the invention to one of ordinary skill in the art.

In addition, the invention may be defined only by the scope of the claim.

Accordingly, in some embodiments, well-known components, operations, and arts are not described in detail in order to avoid obscuring the concepts of the present disclosure.

In addition, the same reference numbers will be used throughout the drawings to refer to the same or like parts, and the terminology used in this specification are used to describe specified embodiments and are not intended to limit the scope of another embodiment.

In this specification, an expression used in the singular encompasses the expression of the plural, unless it has a clearly different meaning in the context, and the terms such as 'comprise (or comprising)' are intended to indicate the existence of one or other components and operations are not intended to preclude the possibility that one or more components and operations may exist or may be added.

All terms (including technical or scientific terms) have the same meanings as generally understood by a person having ordinary skill in the art to which the present disclosure pertains unless mentioned otherwise.

Unless differently defined in the present disclosure, such terms should not be interpreted in an ideal or excessively formal manner.

Hereinafter, the exemplary embodiments of the present disclosure will be described with reference to the accompanying drawings.

Figure 1:
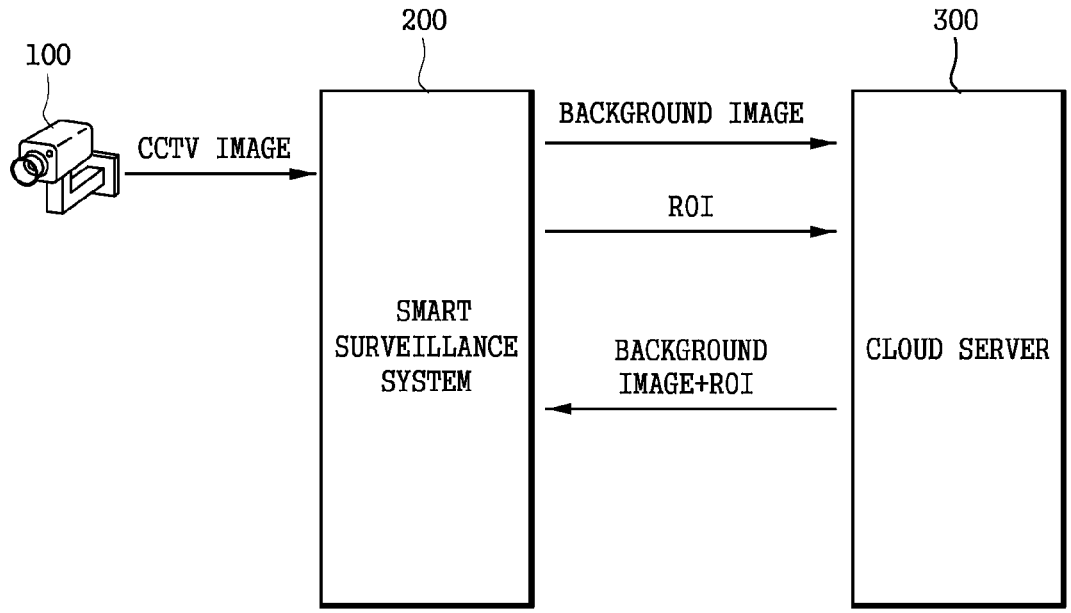
FIG. 1 is a diagram for explaining a smart surveillance system for segmenting a closed circuit television (CCTV) image data into a background image and a region of interest (ROI) and providing the image data to a cloud server according to an embodiment of the present disclosure.

FIG. 1 is a diagram for explaining a smart surveillance system for segmenting a closed circuit television (CCTV) image data into a background image and a region of interest (ROI) and providing the image data to a cloud server according to an embodiment of the present disclosure.

A smart surveillance system 200 according to the present disclosure may receive CCTV image data from a CCTV camera 100, may analyze the received CCTV image data, and may transmit a target data image to a cloud server 300. Here, the smart surveillance system 200 may determine and extract the ROI of an image and may then transmit only the corresponding partial image rather than transmitting the entire image to the cloud server 300.

Here, the ROI may refer to a partial image indicating meaningful movement and shape of an object instead of an unchanged and stationary image such as a background image in the CCTV image data.

The smart surveillance system 200 may remove the stationary background image from the entire image and may then extract partial image data with respect to only an object region based on object recognition via big data analysis during extraction of the ROI.

The smart surveillance system 200 may generate the stationary background image in a separate background image file and may transmit the generate file to the cloud server 300 or may retain the file, and thus, may combine the file with the ROI to restore a complete CCTV image as necessary.

The cloud server 300 may receive and store the ROI.

The cloud server 300 may map the background image received from the smart surveillance system 200 to the ROI and may retain the result image.

Then, when CCTV image data is needed, the smart surveillance system 200 may make a request to the cloud server 300 for data corresponding to the background image and the ROI, may receive the data corresponding to the background image and the ROI from the cloud server 300, and may combine the data with the ROI to restore complete CCTV image data.

In addition, the cloud server 300 may combine the background image with the ROI to restore the complete CCTV image data and may then provide the result image to the smart surveillance system 200.

A main function of the smart surveillance system 200 according to the present disclosure may have characteristics whereby the smart surveillance system 200 does not store the entire image captured by the CCTV camera 100, but instead, stores a stationary background image in the form of an image having a relatively small volume rather than retaining the image in the form of a video image and stores a video image with respect to only a partial image corresponding to a meaningful shape or a moving object based on object recognition via big data analysis.

Here, when the smart surveillance system 200 includes the CCTV camera 100, the CCTV camera 100 may process the ROI region and may transmit the processed ROI data to the cloud server 300.

Figure 2:
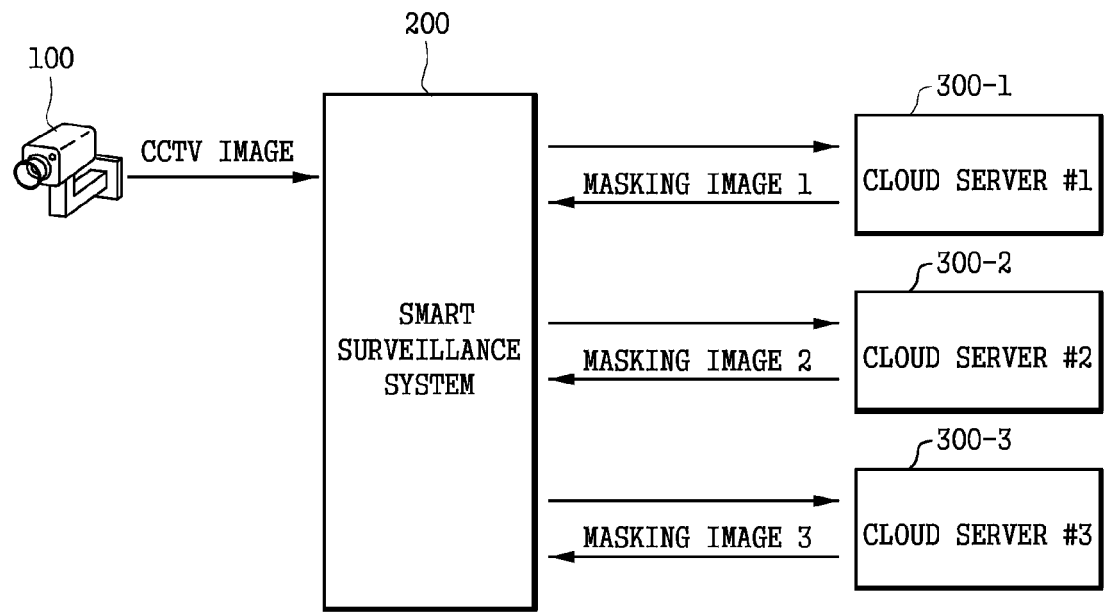
FIG. 2 is a diagram for explaining a smart surveillance system for masking-processing CCTV image data, segmenting the CCTV image data into a plurality of pieces of data, and storing the data in a plurality of cloud servers according to an embodiment of the present disclosure.

FIG. 2 is a diagram for explaining a smart surveillance system for masking-processing CCTV image data, segmenting the CCTV image data into a plurality of pieces of data, and storing the data in a plurality of cloud servers according to an embodiment of the present disclosure.

The smart surveillance system 200 according to the present disclosure may further perform masking-processing to protect privacy As described above with reference to FIG. 1, a background image and an ROI corresponding to an object as a meaningful partial image may be segmented from the CCTV image data by processing big data and the partial image data corresponding to the ROI may be masking-processed.

The ROI may correspond to, for example, a region indicating a shape of the human or a shape of a specific object.

Thus, an image of the ROI may have personal privacy information.

In order to protect the personal privacy information, according to the present disclosure, the smart surveillance system 200 may perform process an image corresponding to the ROI and may process an image by which personal privacy information is to be exposed, with a mask.

The image corresponding to the masking-processed ROI may be segmented into a plurality of making images, and the segmented masking images may be transmitted and stored in a plurality of cloud servers.

That is, the plurality of pieces of segmented masking data may each include one matching number among matching numbers matched with identifications of the cloud servers, and the segmented images having the same matching number may be transmitted to a cloud server corresponding to the matching number and may be stored in the cloud server.

For example, referring to FIG. 2, the ROI may be extracted from the CCTV image data transmitted from the CCTV camera 100 via big data analysis, and the extracted ROI may be masking-processed and may then be segmented into 3 masking images.

Among the 3 segmented masking images, masking image including a matching number matched with an identification of a cloud server #1 300-1 may be transmitted and stored in the cloud server #1 300-1, masking image 2 including a matching number matched with an identification of a cloud server #2 300-2 may be transmitted and stored in the cloud server #2 300-2, and masking image 3 including a matching number matched with an identification of a cloud server #3 300-3 may be transmitted and stored in the cloud server #3 300-3.

Then, when the smart surveillance system 200 makes a request to each cloud server for a masking image, the corresponding cloud server may provide a masking image stored therein to the smart surveillance system 200.

Then, the smart surveillance system 200 may combine the masking images and may restore a masking ROI corresponding to an original ROI.

Here, when an ROI image is segmented, the ROI image may be segmented through an encryption procedure.

For example, when the masking-processed ROI is segmented into 3 images, information included in one segmented masking image may be recognized based on the two remaining segmented masking images, and an accurate ROI image may be restored using only the two segmented masking images.

Figure 3:
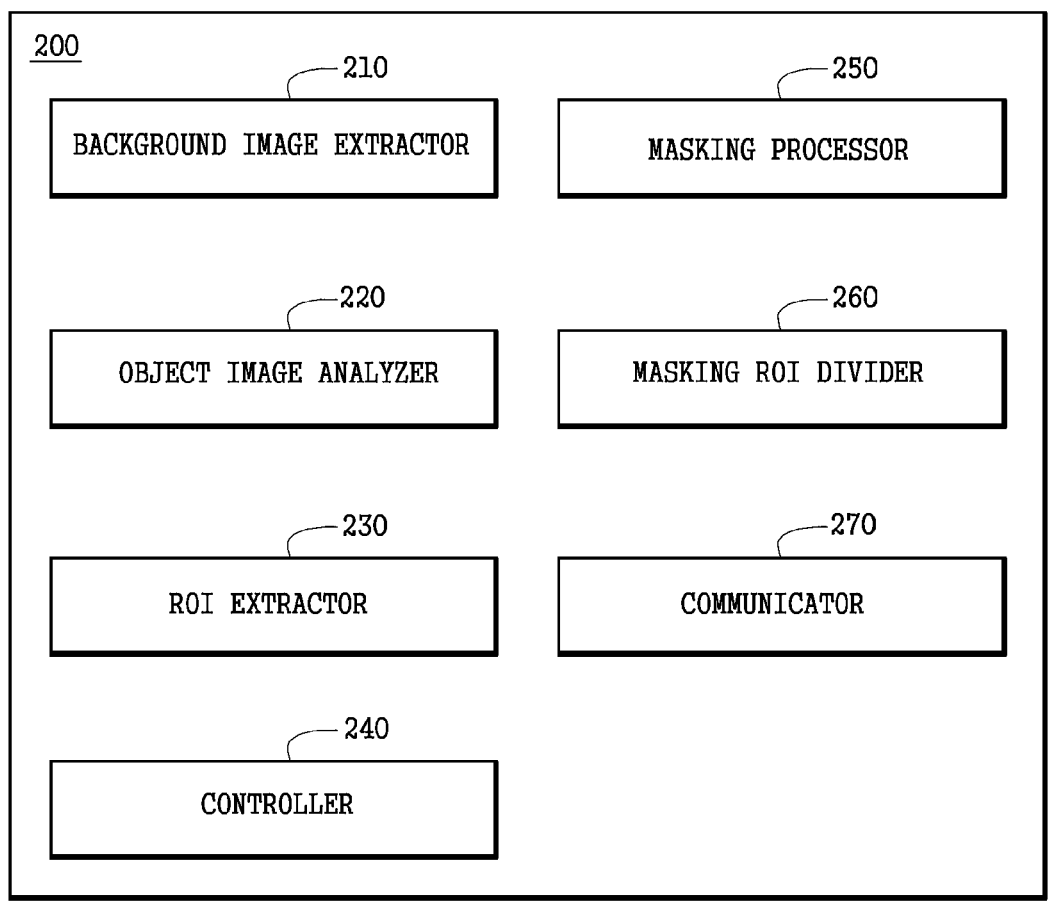
FIG. 3 is a diagram showing a configuration of a smart surveillance system according to an embodiment of the present disclosure.

FIG. 3 is a diagram showing a configuration of a smart surveillance system according to an embodiment of the present disclosure.

The smart surveillance system 200 according to the present disclosure may include a background image extractor 210, an object image analyzer 220, an ROI extractor 230, a controller 240, a masking processor 250, a masking ROI divider 260, and a communicator 270.

The background image extractor 210 may analyze CCTV image data received from the CCTV camera 100 and may extract a background image.

The background image extractor 210 may analyze the CCTV image data and may set, to a background image, an image, a shape of which is not changed for a predetermined time, or an image, a shape of which is not largely changed for a predetermined time.

For example, a stationary image such as a building or a tree may be set to the background image.

The object image analyzer 220 may separate an object image from the background image through big data analysis of the CCTV image data.

When receiving the CCTV image data from the CCTV camera 100 for capturing the same zone, the object image analyzer 220 may analyze big data via image processing for a predetermined time and may separate a stationary background image and an image of an object that performs a meaningful operation.

The ROI extractor 230 may extract a region of interest (ROI) corresponding to an object image. The ROI may be converted when an object is moved to a region corresponding to movement of the object, which is distinguished from the background image. Thus, the ROI extractor 230 may differently extract an ROI depending on movement of an object.

The controller 240 may provide the background image and the ROI to the cloud server 300, and as necessary, the controller 240 may receive the background image and the ROI from the cloud server 300, may combine the background image and the ROI, and may generate a complete CCTV image.

The masking processor 250 may analyze the ROI and may perform masking-processing on a specific portion.

As described above, the ROI is a region including information on a shape of a meaningful object, and thus, may include personal information.

For example, when the object is the human (person), the ROI may include information on an image of the appearance and face of the person. In this case, the masking processor 250 may perform masking-processing on an image portion of the face. In addition, when the object is an automobile, masking-processing may also be performed on a number plate of the automobile.

That is, the masking processor 250 may process an image portion of the ROI, from which personal image is to be exposed, in order to prevent personal information from being exposed.

The masking ROI divider 260 may divide the masking ROI including the masking-process portion into a plurality of pieces through an encryption procedure.

When separating the ROI, the masking ROI divider 260 may separate the ROI through an encryption procedure. Thus, when an encryption method used for separating an image is not known, it may not be possible to restore an accurate ROI image.

The encryption method used in the masking ROI divider 260 will be described below.

The masking ROI divider 260 may use a secret sharing scheme such as secret sharing that is a visual cryptography method. That is, when an image is segmented into N masking images, the image may be segmented using an encryption method of restoring an image prior to segment using encryption information included in (N−1) segmented images.

When a cloud server that stores one segmented masking image is not capable of performing a normal function due to hacking, other natural disaster, or the like, the image prior to segment may also be restored using the remaining (N−1) segmented masking images through encryption for making a decoding threshold for restoring the segmented image to N−1.

Here, the controller 240 may allocate one of matching numbers matched with identifications of cloud servers to each segmented masking ROI and may perform control to transmit the segmented image including the same matching number to a cloud server of the corresponding matching number.

When complete CCTV image data is needed, the controller 240 may make a request to cloud servers for respective segmented masking images stored therein, may receive the images, and may combine the images to restore a masking ROI image corresponding to an original ROI.

The communicator 270 may communicate with the CCTV camera 100 and the cloud server 300 to transmit and receive image data.

Here, the smart surveillance system 200 may include the CCTV camera 100. In this case, the background image extractor 210, the object image analyzer 220, and the ROI extractor 230 may be included in the CCTV camera 100.

In this case, a smart surveillance system except for the CCTV camera 100 may be referred to as a smart surveillance system body.

When the background image extractor 210, the object image analyzer 220, and the ROI extractor 230 are included in the CCTV camera 100, the CCTV camera 100 may extract the background image and the ROI and may transmit the extracted image to a body of the smart surveillance system.

FIG. 4 is a diagram showing a method of segmenting a background image and an ROI from CCTV image data and providing the segmented image to a cloud server according to an embodiment of the present disclosure.

Operation S101 may be an operation of receiving CCTV image data from the CCTV camera 100.

Operation S102 may be an operation of analyzing the CCTV image data, segmenting a background image and an object image, and extracting only the background image by the smart surveillance system 200.

Operation S103 may be an operation of transmitting the extracted background image to the cloud server 300 by the smart surveillance system 200.

Here, the background image may also be changed when a photography direction or target of a CCTV camera is changed.

Thus, when the smart surveillance system 200 analyzes the CCTV image data, if the background image is changed, the smart surveillance system 200 may additionally extract the changed background image and may transmit the extracted image to the cloud server 300.

Operation S104 may be an operation of storing the background image received by the cloud server 300.

Operation S105 may be an ROI extraction operation of extracting only a portion corresponding to an object from the CCTV image data through big data analysis by the smart surveillance system 200.

The smart surveillance system 200 may segment the CCTV image data into a background and an ROI corresponding to the movement or shape of a meaningful object via big data analysis and may extract the ROI from the CCTV image data.

Operation S106 may be an operation of providing the ROI extracted by the smart surveillance system 200 to the cloud server 300.

Operation S107 may be an operation of storing the ROI received by the cloud server 300.

Operation S108 may be an operation of making a request to the cloud server 300 for image information corresponding to the background image and the ROI by the smart surveillance system 200 in case of need.

Operation S109 may be an operation of receiving the background image and the ROI from the cloud server 300 by the smart surveillance system 200.

Operation S110 may be an operation of combining the background image and the ROI that are received from the cloud server 300 to generate a complete CCTV image by the smart surveillance system 200.

FIG. 5 is a diagram showing a method of masking-processing CCTV image data, segmenting the CCTV image data into a plurality of pieces, and storing the segmented images in a plurality of cloud servers according to an embodiment of the present disclosure.

When extracting an ROI and transmitting the extracted ROI to the cloud server 300, the smart surveillance system 200 according to the present disclosure may perform masking-processing on a portion of the ROI image, which indicates personal information, to prevent personal information from being exposed.

FIG. 5 illustrates a method of masking-processing an image portion (e.g., a face or a number plate of an automobile) from which personal information is exposed, segmenting the image into a plurality of pieces, and then, storing the segmented images in a plurality of cloud servers, respectively in order to protect personal information.

Operation S201 may be an operation of receiving CCTV image data from the CCTV camera 100.

Operation S202 may be an operation analyzing the ROI and performing masking-processing on a specific portion when the ROI described with reference to FIG. 4 is extracted.

Here, the specific portion refers to an image portion from which personal information is exposed, for example, a face or a number plate of an automobile.

Operation S203 may be an operation of segmenting a masking ROI including the masking-processed portion into a plurality of pieces through encryption processing.

Here, the encryption processing may use visual cryptography (encryption) using secret sharing.

That is, when an image is segmented into a plurality of pieces via secret sharing and the segmented segment images overlap, an image prior to segment may be represented. However, here, a decoding threshold may be used as N−1 for restoring image information prior to segment only when secret-shared encryption information of minimum (N−1) segment images is present to segment N images.

Thus, even if one segmented segment image is lost, when the remaining (N−1) segment image is present, a complete image prior to segment may be restored.

According to the present disclosure, due to the characteristics, even if one segment image of the N segmented segment images is lost or is exposed due to hacking or the like, a complete image may be restored using the remaining segmented images, and information on the complete image may not be known using only one exposed segment image.

Here, the smart surveillance system 200 may allocate one of matching numbers matched with identifications of cloud servers to each segmented masking ROI and may transmit the segmented image including the same matching number to a cloud server of the corresponding matching number.

Operations S204, S205, and S206 may be an operation of transmitting the segmented ROI image processed with a mask to a cloud server corresponding to a matched identification and storing the image.

Operations S207, S208, and S209 may be an operation of transmitting the segmented image stored in each cloud server to the smart surveillance system 200 according to a request of the smart surveillance system 200.

Operation S210 may be an operation of restoring a masking ROI image prior to segment by visually decoding the segmented image received by the smart surveillance system 200.

According to the present disclosure, when CCTV image data is stored, a background image may be stored in an image file with a small volume and only an object image may be stored as video image data, and thus, the CCTV image data may be stored and managed using relatively low capacity and cost.

In addition, according to the present disclosure, the CCTV image data may be encryption-processed and sharing-stored, and thus, even if a specific client server is hacked, there may be no risk of exposure of personal information.

It will be apparent to those skilled in the art that various modifications and variations can be made in the present disclosure without departing from the spirit or scope of the invention. Thus, it is intended that the present disclosure cover the modifications and variations of this invention provided they come within the scope of the appended claims and their equivalents.

What is claimed is:

1. A smart surveillance system which receives CCTV image data from a CCTV camera and analyzes the received CCTV image data and transmits the image data to one or more of cloud servers, comprising:
    a communicator configured to communicate with a closed circuit television (CCTV) camera and the one or more of cloud servers;
    a background image extractor configured to analyze CCTV image data received from the CCTV camera and to extract a background image;
    an object image analyzer configured to distinguish an object image from the background image based on object recognition analysis of the CCTV image data;
    a region of interest (ROI) extractor configured to extract an ROI corresponding to the object image;
    a masking processor configured to analyze the ROI and generate a masking ROI by performing masking-processing on a specific portion of privacy;
    a masking ROI divider configured to divide the masking ROI including the masking-processed portion into a plurality of pieces via encryption processing; and
    a controller configured to generate a stationary background image in a separate background image file, provide the background image file and the ROI or the divided masking ROIs as a video data to the one or more of cloud servers, and combine the background image file and the ROI video data, after receiving from the one or more of cloud servers or after receiving the divided masking ROIs from respective of the one or more of cloud servers and restoring the ROI of prior to the masking processing, to generate a complete CCTV image data, if necessary,
    wherein the masking ROI is divided into N divided masking ROIs using a visual cryptography of a secret sharing method and the encryption processing is performed to set a decoding threshold to N−1 for restoring the divided image, thereby, when one of the divided masking ROIs is lost, the masking ROI of prior to the dividing is able to be restored using only remaining (N−1) divided masking ROIs, and
    wherein the controller allocates matching numbers matched with identifications of the one or more cloud servers to the divided masking ROIs and transmits divided images including respective matching numbers to the one or more cloud servers having corresponding matching numbers.

2. The smart surveillance system of claim 1, wherein the masking processor performs masking-processing on a portion for identifying personal information.

3. The smart surveillance system of claim 2, wherein the portion for identifying the personal information comprises one or more of a face of a person or a number plate of an automobile.

4. A method of a smart surveillance system which receives CCTV image data from a CCTV camera and analyzes the received CCTV image data and transmits the image data to one or more of cloud servers, the method comprising:
    receiving closed circuit television (CCTV) image data from a CCTV camera;
    analyzing the CCTV image data and extracting a background image;
    storing the background image in the one or more of cloud servers;
    analyzing the CCTV image data based on object recognition analysis of the CCTV image data and distinguishing an object image from the background image;
    extracting a region of interest (ROI) corresponding to the object image;
    analyzing the ROI and generating a masking ROI by performing masking-processing on a specific portion of privacy;
    dividing the masking ROI including the masking-processed portion into a plurality of pieces via encryption processing;
    generating a stationary background image in a separate background image file;
    providing the ROI or the divided masking ROIs as a video data to the one or more of cloud servers;
    providing the background image file and the ROI or the divided masking ROIs as a video data to the one or more of cloud servers; and
    combining the background image file and the ROI video data, after receiving from the one or more of cloud servers or after receiving the divided masking ROIs from respective of the one or more of cloud servers and restoring the ROI of prior to the masking processing, to generate a complete CCTV image, if necessary,
    wherein the masking ROI is divided into N divided masking ROIs using a visual cryptography of a secret sharing method and the encryption processing is performed to set a decoding threshold to N−1 for restoring the divided image, thereby, when one of the divided masking ROIs is lost, the masking ROI of prior to the dividing is able to be restored using only remaining (N−1) divided masking ROIs, and
    wherein matching numbers, which are matched with identifications of the one or more cloud servers, are allocated to the divided masking ROIs and divided images including respective matching numbers are transmitted to the one or more cloud servers having corresponding matching numbers.

5. The method of claim 4, wherein the specific portion is a portion for identifying personal information.

6. The method of claim 5, wherein the portion for identifying the personal information comprises one or more of a face of a person or a number plate of an automobile.

* * * * *